(12) United States Patent
Lu

(10) Patent No.: US 7,104,692 B1
(45) Date of Patent: Sep. 12, 2006

(54) BALL SLEEVE FOR USE IN THE INNER SLIDING RAIL OF A HIDDEN SLIDING TRACK ASSEMBLY

(76) Inventor: Chun-Min Lu, 1F., No. 12, Alley 12, Lane 151, Sha-Lun Rd., Tamshui Chen, Taipei Hsien (TW)

( * ) Notice: Subject to any disclaimer, the term of this patent is extended or adjusted under 35 U.S.C. 154(b) by 127 days.

(21) Appl. No.: 10/984,793

(22) Filed: Nov. 10, 2004

(51) Int. Cl.
*F16C 29/04* (2006.01)

(52) U.S. Cl. ....................................................... 384/49

(58) Field of Classification Search ................. 384/49, 384/18, 45, 43, 44
See application file for complete search history.

(56) References Cited

U.S. PATENT DOCUMENTS 6,082,210 A * 7/2000 Ise ............................. 384/49
6,113,273 A * 9/2000 Eberle et al. ................. 384/40

* cited by examiner

Primary Examiner—Lenard A. Footland
(74) Attorney, Agent, or Firm—Troxell Law Office, PLLC

(57) ABSTRACT

A ball sleeve coupled between inner sliding rail and outer sliding rail of a hidden sliding track assembly is disclosed having four longitudinal rows of openings for accommodating balls, a narrow thin wall portion longitudinally extended on the middle between two distal ends of the top wall thereof through which the user can expand said sleeve body for easy installation of the balls in the openings and easy coupling of the ball sleeve to the inner sliding rail of a hidden sliding track assembly, and a plurality of recessed bearing portions respectively disposed at two sides of each of opening for supporting the balls in the openings.

3 Claims, 6 Drawing Sheets

BALL SLEEVE FOR USE IN THE INNER SLIDING RAIL OF A HIDDEN SLIDING TRACK ASSEMBLY

BACKGROUND AND SUMMARY OF THE INVENTION

The present invention relates to a hidden sliding track assembly for drawer or the like and more specifically, to a ball sleeve for use in the inner sliding rail of a hidden sliding track assembly, which has a narrow thin wall portion on the middle of the top wall of the sleeve body thereof for easy installation, and recessed bearing portions for supporting balls in respective openings in the sleeve body.

A regular ball sleeve 6 for use in a hidden sliding track assembly (see FIG. 1) has a sleeve body 61 of substantially η-shaped cross section. The sleeve body has four longitudinal rows of openings 611 respectively arranged in four angles of the inside space. Balls 7 are respectively mounted in the openings 611 by means of the application of a special mold and a special machine. After installation of the balls 7 in the openings 611, the ball sleeve 6 is coupled to the inner sliding rail 8 and the outer sliding rail 9. This ball sleeve installation procedure is complicated. In order to prevent falling of balls 7 out of the openings 611 of the sleeve body 61, the sleeve body 61 must be coupled to inner sliding rail 8 and the outer sliding rail 9 step by step each time a limited number of balls 7 have been installed in the openings 611. Further, the mounting tools are expensive.

The present invention has been accomplished under the circumstances in view. It is therefore one object of the present invention to provide a ball sleeve for use in the inner sliding rail of a hidden sliding track assembly, which is easy to install. It is another object of the present invention to provide a ball sleeve for use in the inner sliding rail of a hidden sliding track assembly, which is inexpensive to manufacture.

According to one aspect of the present invention, the ball sleeve has a narrow thin wall portion longitudinally extended on the middle between the two ends of the top wall of the sleeve body thereof through which the user can expand the sleeve body for easy installation of balls in the openings and easy coupling of the ball sleeve to the inner sliding rail of a hidden sliding track. According to another aspect of the present invention, the sleeve body of the ball sleeve further has a plurality of recessed bearing portions respectively disposed at two sides of each opening for supporting the balls in the openings, keeping the balls rotatably in close contact between the inner sliding rail and outer sliding rail of the hidden sliding track assembly.

DETAILED DESCRIPTION OF THE INVENTION

Figure 1:
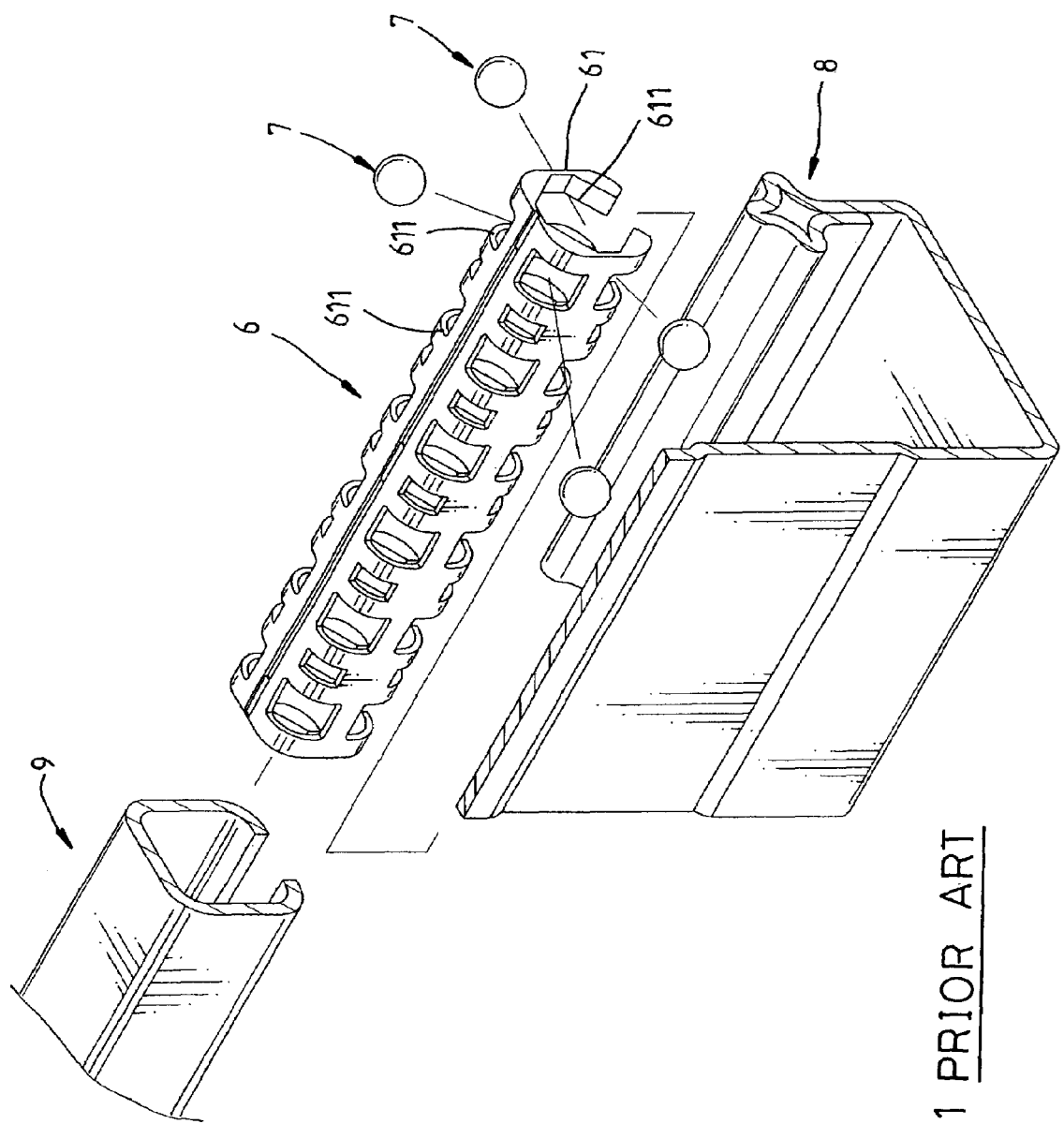
FIG. 1 is an exploded view of an inner sliding rail, a ball sleeve, and an outer sliding rail according to the prior art design.
Figure 2:
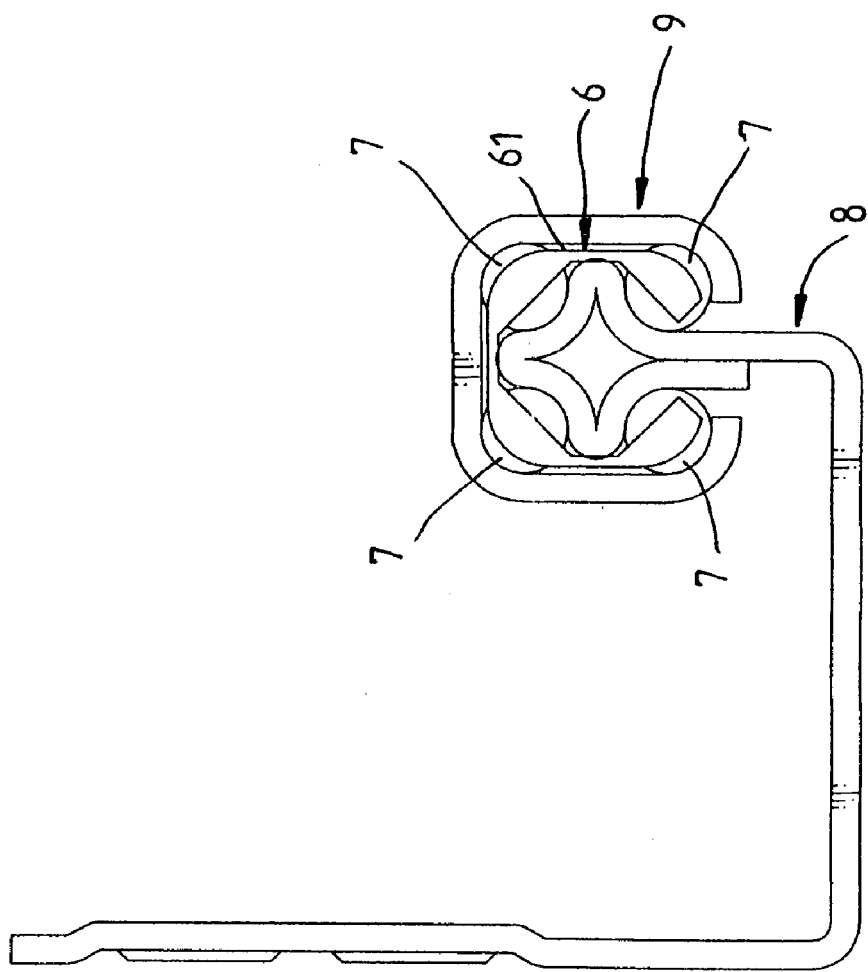
FIG. 2 is a sectional assembly plain view of the prior art design.
Figure 3:
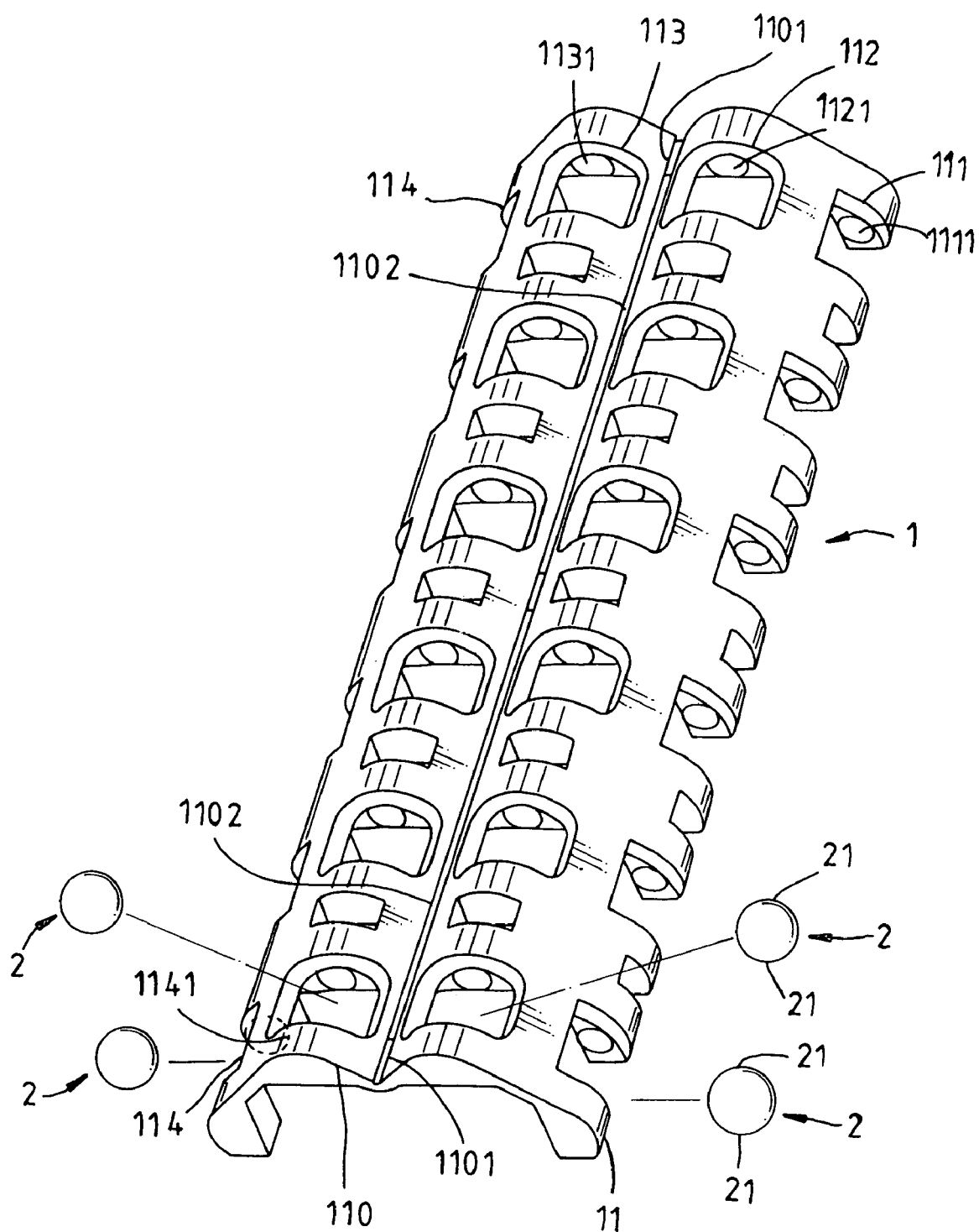
FIG. 3 is an exploded view of the preferred embodiment of the present invention.
Figure 4:
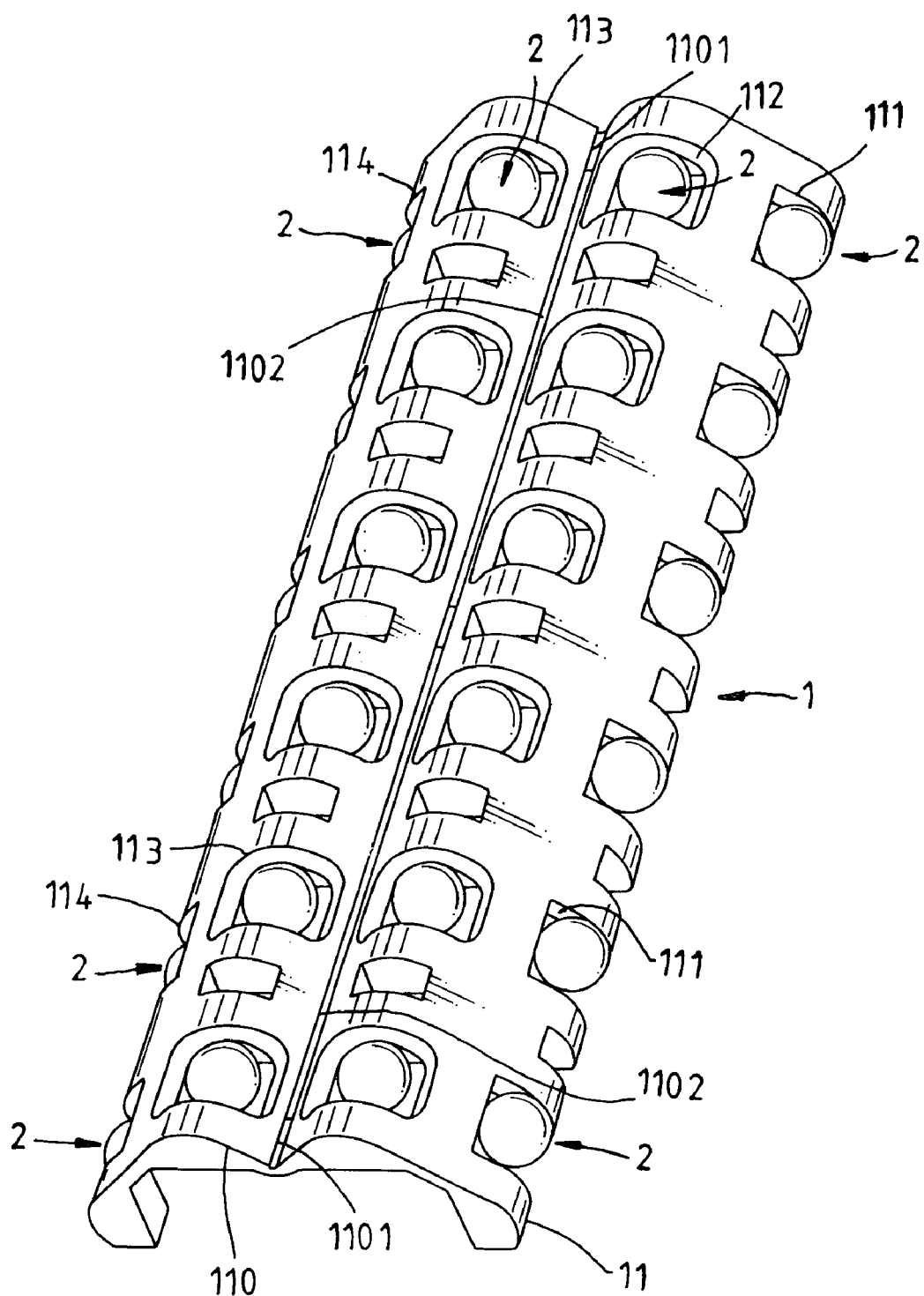
FIG. 4 is a perspective assembly view of the preferred embodiment of the present invention.
Figure 5:
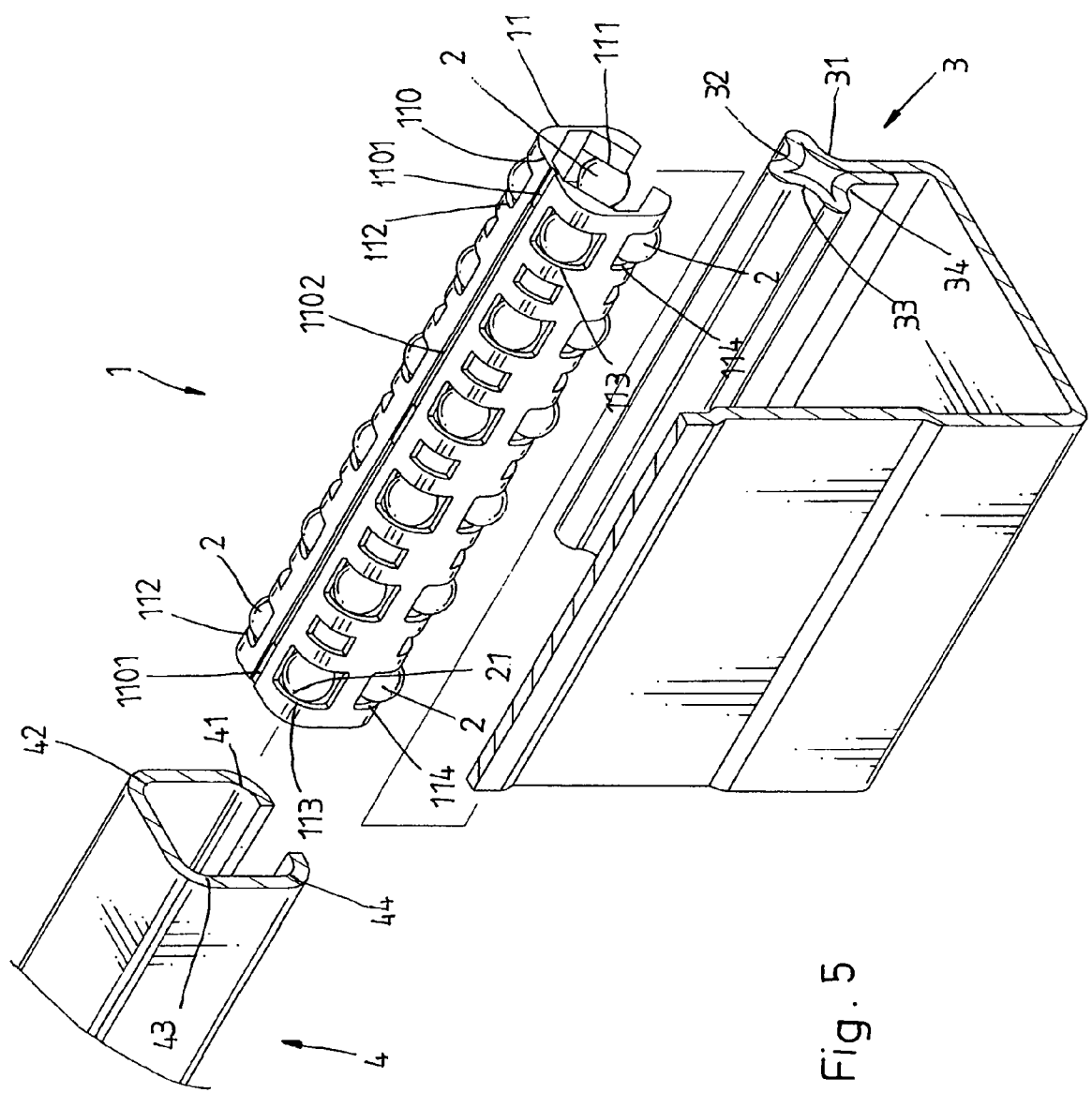
FIG. 5 is an exploded view showing the relationship between the ball sleeve and parts of a hidden sliding track assembly according to the present invention.
Figure 6:
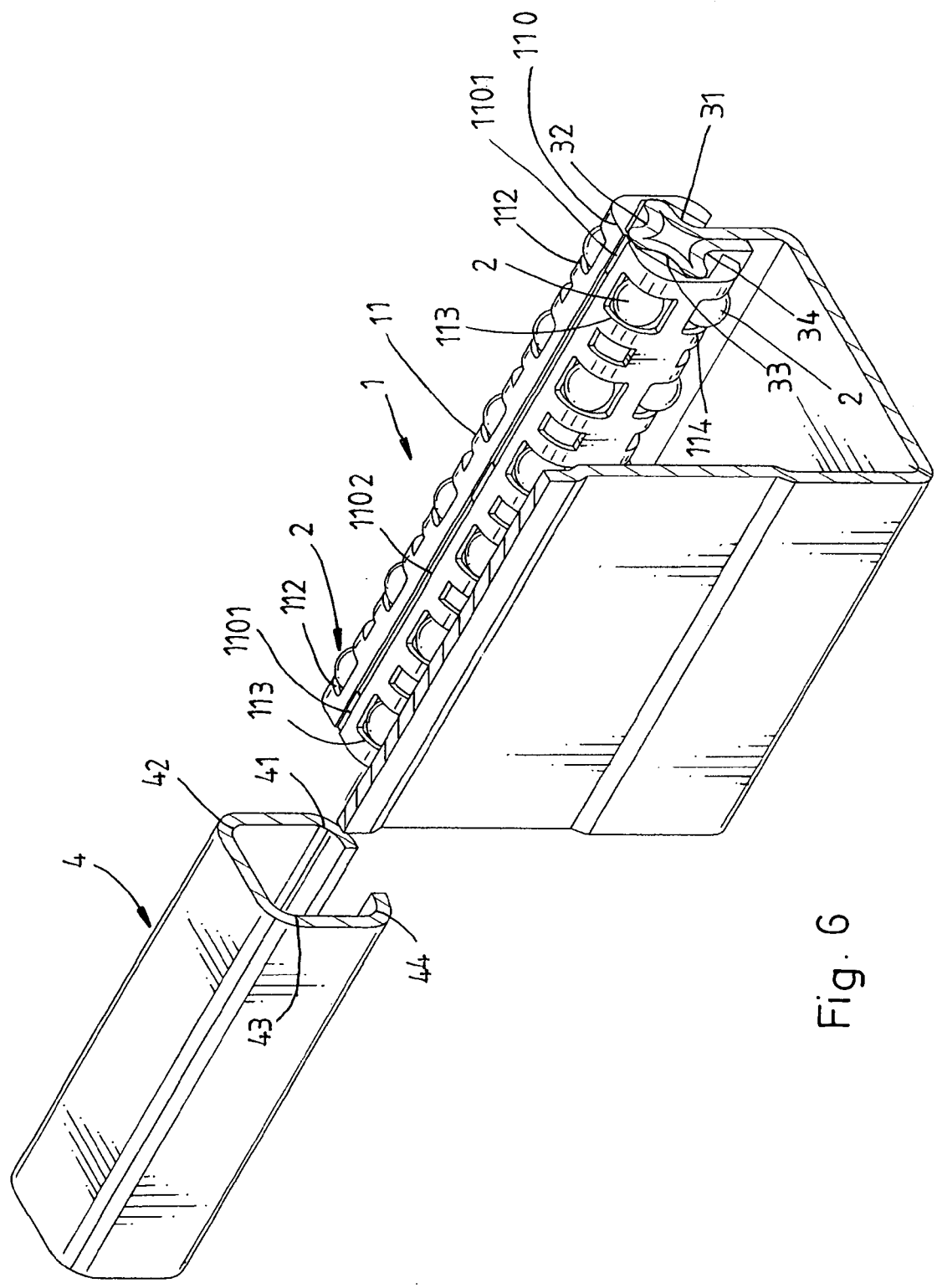
FIG. 6 is similar to FIG. 5 but showing the ball sleeve coupled to the inner sliding rail.

Referring to FIGS. 3~6, a ball sleeve 1 is shown comprising a sleeve body 11 of substantially η-shaped cross section, having four longitudinal rows of openings 111~114 respectively arranged in four angles of the inside space, and a plurality of balls 2 respectively mounted in the openings 111~114. After coupling of the ball sleeve 1 to a hidden sliding track assembly's inner sliding rail 3, the balls 2 in the four rows of openings 111~114 are respectively maintained in contact between respective sliding grooves 31~34 of the inner sliding rail 3 and respective sliding grooves 41~44 of the sliding track assembly's outer sliding rail 4 to support the outer sliding rail 4 on the inner sliding rail 3.

The main features of the present invention are outlined hereinafter. The sleeve body 11 of the ball sleeve 1 has a narrow thin wall portion 1101 longitudinally extended on the middle between the two ends of the top wall 110 thereof through which the user can expand the sleeve body 11 for easy installation of the balls 2 in the openings 111~114 and easy coupling of the ball sleeve 1 to the inner sliding rail 3, and a plurality of recessed bearing portions 1111~1141 respectively disposed at two sides of each of the openings 111~114 for supporting two sides 21 of each of the balls 2 in the openings 111~114, keeping the balls 2 in close contact between the inner sliding rail 3 and the outer sliding rail 4.

Further, slots 1102 are formed in the narrow thin wall portion 1101 of the sleeve body 11 of the ball sleeve 1, thereby making the narrow thin wall portion 1101 more flexible for expanding.

Further, recessed bearing portions 1111~1141 are smoothly curved inwards to fit the spherical shape of the balls 2 so that the balls 2 can be rotated smoothly in the respective openings 1111~1141.

As indicated above, the invention has the following advantages:

1. The sleeve body 11 of the ball sleeve 1 has a narrow thin wall portion 1101 longitudinally extended on the middle between the two ends of the top wall 110 thereof through which the user can expand the sleeve body 11 for easy installation of the balls 2 in the openings 111~14 and easy coupling of the ball sleeve 1 to the inner sliding rail 3.

2. The sleeve body 11 of the ball sleeve 1 further has a plurality of recessed bearing portions 1111~1141 respectively disposed at two sides of each of the openings 111~114 for supporting two sides 21 of each of the balls 2 in the openings 111~114, keeping the balls 2 in close contact between the inner sliding rail 3 and the outer sliding rail 4 and preventing falling of the balls 2 out of the sleeve body 11.

What is claimed is:

1. A ball sleeve coupled between inner sliding rail and outer sliding rail of a hidden sliding track assembly, comprising a sleeve body, said sleeve body having a substantially η-shaped cross section and four longitudinal rows of openings respectively arranged in four angles of an inside space thereof, and a plurality of balls respectively mounted in said openings and disposed in contact between respective sliding grooves of said inner sliding rail and respective sliding grooves of said outer sliding rail, wherein said sleeve body has a narrow thin wall portion longitudinally extended on the middle between two distal ends of a top wall thereof through which the user can expand said sleeve body for easy installation of said balls in said openings and easy coupling of said ball sleeve to said inner sliding rail, and a plurality of recessed bearing portions respectively disposed at two sides of each of said openings for supporting said balls in said openings.

2. The ball sleeve as claimed in claim 1, wherein said sleeve body has a plurality of slots formed in said narrow thin wall portion.

3. The ball sleeve as claimed in claim 1, wherein said recessed bearing portions are smoothly curved inwards to fit the periphery of said balls for enabling said balls to be rotated in the respective openings.

* * * * *